(12) United States Patent
Casillan et al.

(10) Patent No.: US 8,604,798 B2
(45) Date of Patent: Dec. 10, 2013

(54) SHORT-CIRCUIT DETECTION FOR TOUCH PANELS

(75) Inventors: Anthony Junior Casillan, Singapore (SG); Yannick Guedon, Mimosa Park (SG); Dianbo Guo, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 469 days.

(21) Appl. No.: 12/965,170

(22) Filed: Dec. 10, 2010

(65) Prior Publication Data

US 2012/0146657 A1     Jun. 14, 2012

(51) Int. Cl.
*G01R 31/28* (2006.01)
*G01R 31/08* (2006.01)

(52) U.S. Cl.
USPC ........................... 324/511; 324/555; 324/527

(58) Field of Classification Search
USPC ......... 324/511, 509, 510, 512, 522, 523, 527, 324/528, 537, 538, 539, 543, 500, 76.11; 345/174, 173
See application file for complete search history.

(56) References Cited

U.S. PATENT DOCUMENTS

| | | | |
|---|---|---|---|
| 5,363,048 A * | 11/1994 | Modlin et al. | 324/519 |
| 7,100,504 B2 * | 9/2006 | Toledo | 101/477 |
| 7,825,679 B2 * | 11/2010 | Martin et al. | 324/750.3 |
| 7,916,127 B2 * | 3/2011 | Wang | 345/174 |
| 2007/0200831 A1 * | 8/2007 | Wang | 345/173 |
| 2011/0050620 A1 * | 3/2011 | Hristov | 345/174 |
| 2011/0121985 A1 * | 5/2011 | Yamamoto | 340/650 |

* cited by examiner

*Primary Examiner* — Hoai-An D Nguyen
(74) *Attorney, Agent, or Firm* — Wolf, Greenfield & Sacks, P.C.

(57) ABSTRACT

A short circuit detection module for a touch panel includes first and second short circuit detection circuits. The first short circuit detection circuit is coupled to a first conductive line of the touch panel. The first short circuit detection circuit is configured to drive the first conductive line with a first signal having a first logic level. The second short circuit detection circuit is coupled to second, adjacent, conductive line of the touch panel. The second short circuit detection circuit is configured to drive the second conductive line with a second signal having a second logic level that is complementary to the first logic level.

21 Claims, 9 Drawing Sheets

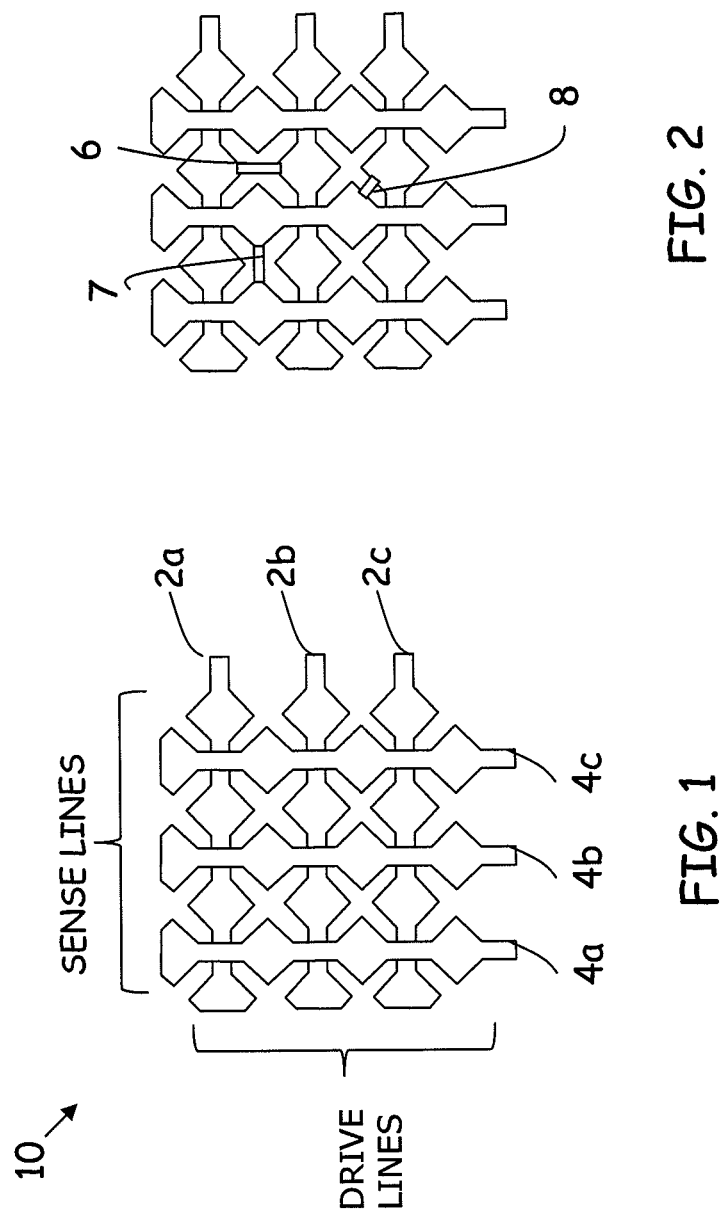

SHORT-CIRCUIT DETECTION FOR TOUCH PANELS

BACKGROUND

1. Technical Field

The techniques described herein relate generally to detecting short circuits, and in particular to the detection of short circuits in a capacitive touch panel.

2. Discussion of the Related Art

Capacitive touch screens have been widely adopted in mobile applications such as in cellular telephones, tablet computers, and the like. Capacitive touch screens offer multi-touch and soft-touch features, high durability and suitable light transmittance. Although improvements have been made in the production testing of touch screen display modules, failures remain a problem.

SUMMARY

Some embodiments relate to a short circuit detection circuit for a touch panel. The short circuit detection circuit includes an output buffer configured to receive a first signal and to provide the first signal to a conductive line of the touch panel. The short circuit detection circuit also includes an input buffer configured to receive a second signal from the conductive line. The short circuit detection circuit further includes a comparison circuit that determines whether the first signal and the second signal are at a same logic level.

Some embodiments relate to a short circuit detection module for a touch panel. The short circuit detection module includes first and second short circuit detection circuits. The first short circuit detection circuit is coupled to a first conductive line of the touch panel. The first short circuit detection circuit is configured to drive the first conductive line with a first signal having a first logic level. The second short circuit detection circuit is coupled to second, adjacent, conductive line of the touch panel. The second short circuit detection circuit is configured to drive the second conductive line with a second signal having a second logic level that is complementary to the first logic level.

Some embodiments relate to a device that includes a capacitive touch panel comprising a plurality of conductive lines; and means for detecting a short circuit between respective conductive lines of the plurality of conductive lines.

Some embodiments relate to a device that includes a capacitive touch panel comprising a plurality of conductive lines; and a short circuit detection module configured to detect a short circuit between respective conductive lines of the plurality of conductive lines.

Some embodiments relate to a method of detecting a short circuit in a touch panel. The method includes driving a first conductive line with a first signal; detecting a second signal from the conductive line; and determining whether the first signal is at a same logic level as the second signal.

The foregoing is summary is provided by way of example and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the invention.

FIG. 1 shows a portion of a touch panel.

FIG. 2 shows examples of short circuits between adjacent conductive lines in a touch panel.

DETAILED DESCRIPTION

Figure 3:
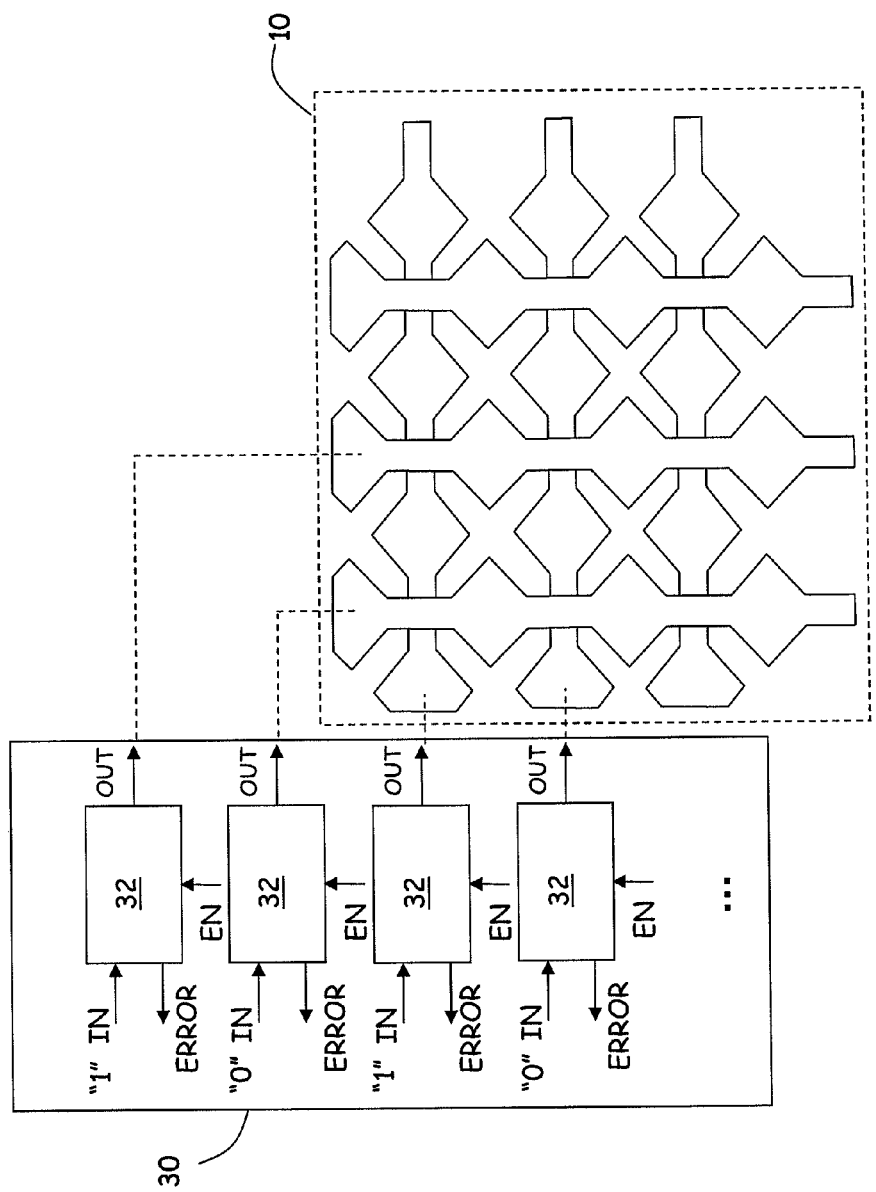
FIG. 3 shows an example of a short circuit detection module that includes a plurality of short circuit detection circuits, according to some embodiments.

The conductive lines of a capacitive touch panel can be shorted together when a manufacturing defect occurs or the capacitive touch panel is damaged. FIG. 1 shows an example of a portion of a touch panel 10. As shown in FIG. 1, the touch panel 10 includes a plurality of conductive drive lines 2a, 2b, 2c and a plurality of conductive sense lines 4a, 4b, 4c running substantially perpendicular to the drive lines. Although three drive lines and three sense lines are shown in FIG. 1, it should be appreciated that a capacitive touch panel may have any suitable number of drive and sense lines. Also, the number of drive lines need not be equal to the number of sense lines, as the techniques described herein are not limited in these respects.

The sense lines 4a, 4b and 4c may be disposed above the drive lines 2a, 2b, and 2c, as shown in FIG. 1. However, the sense lines need not be disposed above the drive lines, as the drive and sense lines can lie over or under each other in any suitable configuration. The drive and sense lines may be separated from one another by an insulating layer to prevent the drive and sense lines from shorting together. A transparent insulating surface may lie over the drive and sense lines to provide a combination display surface and touch surface. Any suitable transparent insulating surface may be used, such as glass, for example. One or more display devices may lie beneath the transparent insulating surface to generate an image for a user. When a user touches the touch panel 10 at a particular location, the capacitance is changed between an overlapping drive line and sense line near the location touched by the user. The change in capacitance between the drive line and the sense line can be sensed to detect operation of the touch panel at a particular location.

FIG. 2 shows examples of short circuits that can occur between conductive lines of the touch screen panel 10. For example, shorts can occur between adjacent drive lines, between adjacent sense lines, or between a drive line and an adjacent sense line. FIG. 2 illustrates a short circuit 6 between adjacent drive lines, a short circuit 7 between adjacent sense lines, and a short circuit 8 between a drive line and sense line. These shorts can cause errors in the operation of the touch panel 10 and can cause damage to various components, such as the driver module for the touch panel. In some cases, the entire touch panel can be rendered inoperative when a short occurs, and may need to be replaced. Short circuits can lead to additional costs in a manufacturing process due to the time spent debugging failed touch panel modules.

In light of these problems, the Applicants have developed circuits and methods for detecting short circuits in touch panels. These techniques can facilitate early detection of damaged touch panels, which can reduce the need for debugging failed devices. Short circuits can be detected prior to connecting a damaged touch panel to the touch panel's driver module, thereby avoiding damaging the driver module or other circuitry.

FIG. 3 shows an example of a short circuit detection module 30, according to some embodiments. Short circuit detection module 30 includes a plurality of short circuit detection circuits 32. Although FIG. 3 shows four short circuit detection circuits 32, any suitable number of short circuit detection circuits 32 may be included in short circuit detection module 30. In some embodiments, the short circuit detection module 30 includes a short circuit detection circuit 32 for each drive line and each sense line of the touch panel. For example if the touch panel comprises n drive lines and m sense lines, the short circuit detection module can include n+m short circuit detection circuits 32.

As shown in FIG. 3, each drive and sense line can be connected to the output of a corresponding short circuit detection circuit 32.

Each short circuit detection circuit 32 drives a corresponding drive or sense line of the touch panel, with adjacent lines being driven by signals of complementary (i.e., opposite) logic levels, "1" and "0." Thus, when no shorts occur, adjacent conductive lines are driven to different logic levels. Each short circuit detection circuit 32 is designed to have a weak pull up driving capability and a strong pull down driving capability at its output terminal OUT, in some embodiments. When a short occurs between adjacent lines, contention occurs between the outputs of the short circuit detection circuits 32 that are attempting to drive their corresponding conductive lines to different logic levels. The short circuit detection circuit 32 that is controlled to drive its corresponding line to the high logic level will be unable to do so because the adjacent line to which it is shorted is driven to the low logic level. Since the pull-down capability of the short circuit detection circuit 32 is greater than its pull-up capability, the lines that are shorted together are driven to the low logic level. The logic levels of the input and output signals of a short circuit detection circuit 32 can be compared. If the input and output logic levels are different, then it can be concluded that a short circuit is present in the touch panel. Such a comparison can be made for each short circuit detection circuit 32 to determine whether a short is present between adjacent conductive lines anywhere in the touch panel. In the event that a short circuit is detected, the touch panel can be discarded and/or replaced.

Figure 4:
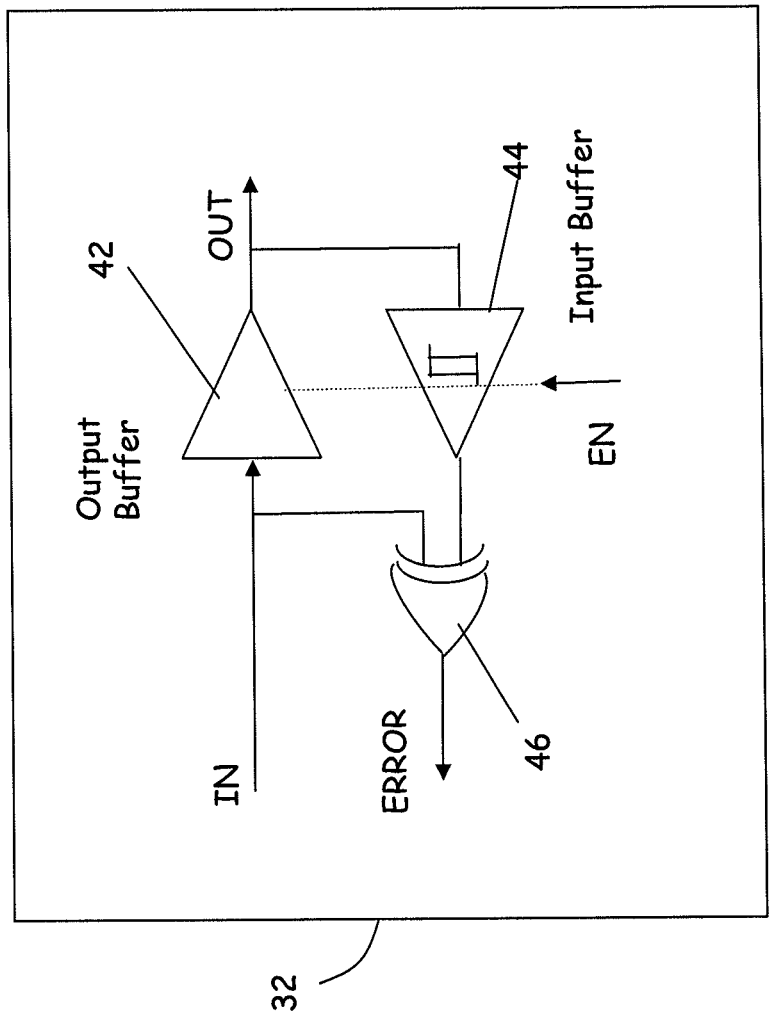
FIG. 4 shows an example of a short circuit detection circuit, according to some embodiments.

FIG. 4 shows an example of a short circuit detection circuit 32, according to some embodiments. The short circuit detection circuit 32 has an output buffer 42, an input buffer 44 and an XOR gate 46. Output buffer 42 and input buffer 44 receive an enable signal EN that enables their operation. The short circuit detection circuit 32 receives an input signal IN that is provided to the output buffer 42 which provides a buffered version of the input signal to the corresponding conductive line of the touch panel. The output signal OUT at the conductive line is detected by input buffer 44 which provides a buffered version of the signal OUT to the XOR gate 46. XOR gate 46 compares the signals IN and OUT to determine whether they are at the same logic level. If the input and output signals are at the same logic level, then the output ERROR of XOR gate 46 is at a low logic level. If the input signal and the output signal are not at the same logic level, then the output ERROR of the XOR gate 46 is at a high logic level. When signal ERROR is at a high logic level, this indicates that a short circuit has been detected in the touch panel.

Figure 5B:
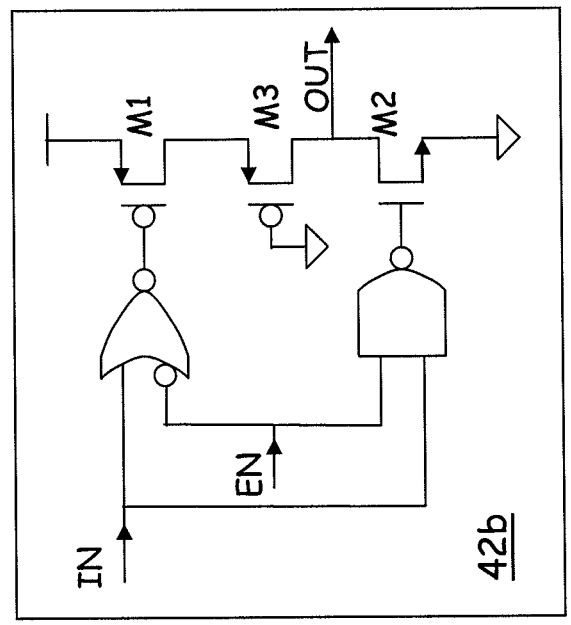
FIGS. 5a-5c show examples of output buffers for a short circuit detection circuit, according to some embodiments.
Figure 5A:
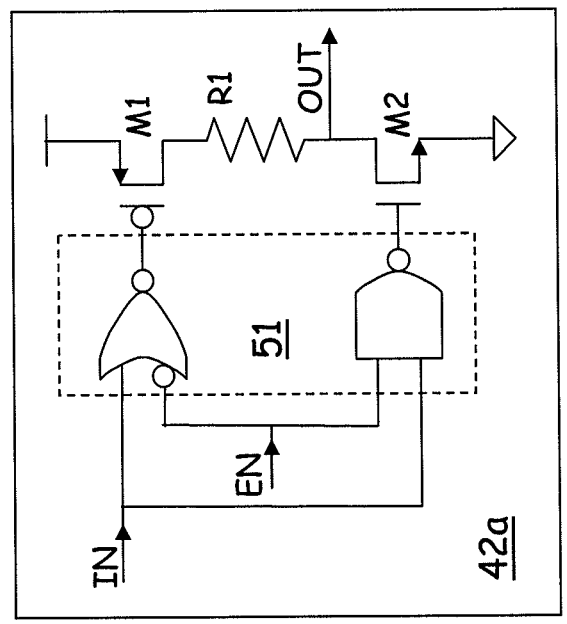
Figure 5C:
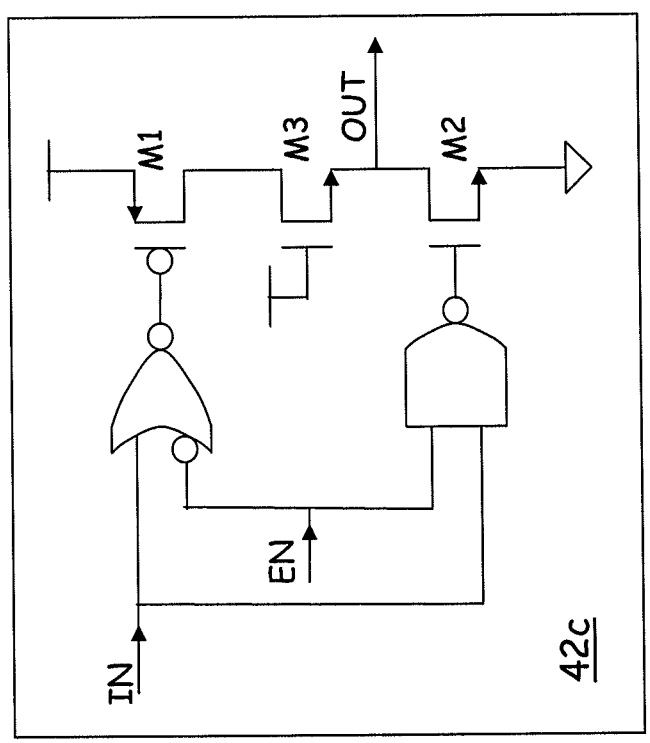

Any suitable output buffer 42 may be used that has a pull-up capability different from its pull-down capability. FIG. 5a shows an embodiment of an output buffer 42a having an inverter 51, a PMOS switch M1, an NMOS switch M2, and a resistor R1. Due to the resistance of resistor R1, the pull-down capability of output buffer 42a is greater than its pull-up capability. The output resistance of output buffer 42a is higher when it is driving the output to a high logic level than when it is driving the output to a low logic level, due to resistor R1. In some embodiments, the resistance value of resistor R1 can be selected to be at least three times greater than the largest resistance of the touch panel between any drive and sense line, for proper detection. FIG. 5b shows another embodiment of an output buffer 42b in which the resistor R1 is replaced with a long-length channel transistor M3. In FIG. 5b, transistor M3 is shown as a PMOS transistor with its gate configured to be coupled to ground in operation. FIG. 5c shows another embodiment of an output buffer 42c in which transistor M3 is a NMOS transistor having its gate coupled to a voltage corresponding to a high logic level.

Figure 6B:
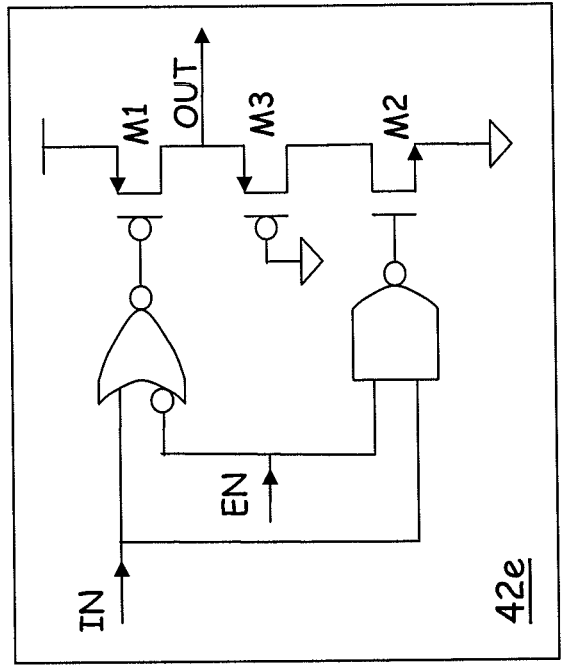
FIGS. 6a-6c show further examples of short circuit detection circuits, according to some embodiments.
Figure 6A:
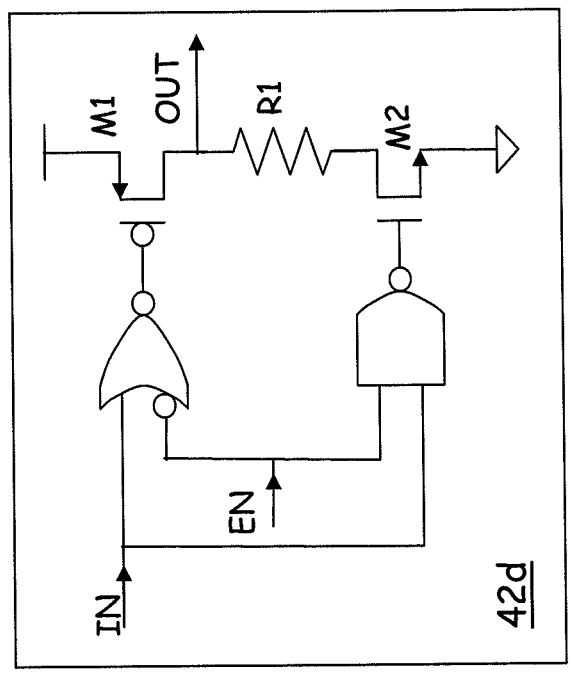
Figure 6C:
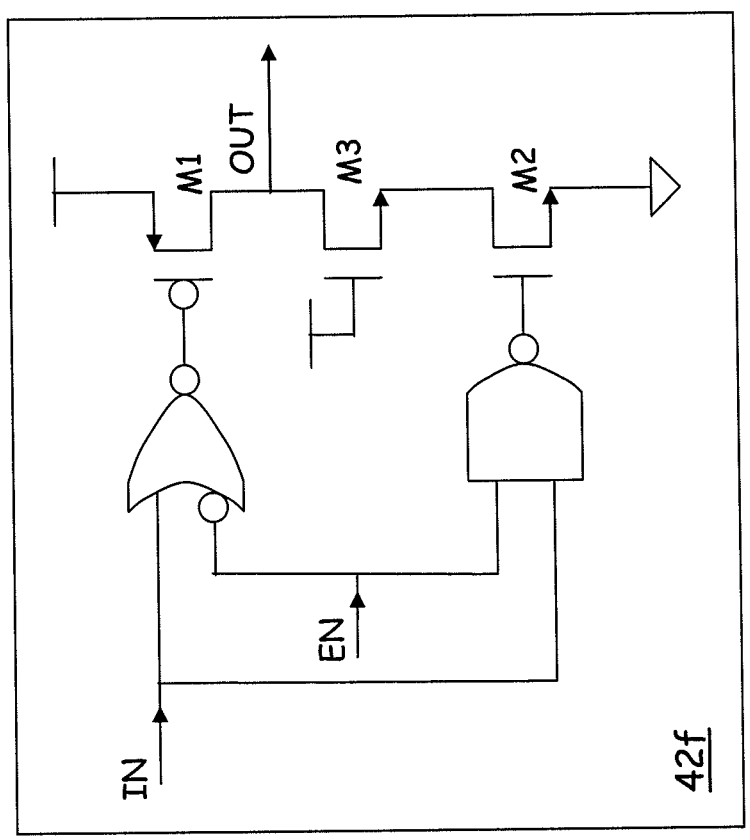

Alternatively, the output buffer 42 for each short circuit detection circuit 32 can have a strong pull-up capability and a weak pull-down capability. FIGS. 6a-6c show examples of output buffers with a strong pull-up capability and weak-pull down capability. The embodiment of FIG. 6A shows an output buffer 42d similar to that of output buffer 42a, but with the output signal being taken from the high side of resistor R1 rather than the low side of resistor R1. FIGS. 6B and 6C show embodiments of output buffers 42e and 42f in which the resistor R1 of FIG. 6A is replaced with a long length PMOS transistor M3 (FIG. 6B), or an NMOS transistor M3 (FIG. 6C).

The short circuit detection module 30 can have a quantity of short circuit detection circuits that is proportional to the number of drive and sense lines in the touch panel. For example, a touch panel with sixteen drive lines and sixteen sense lines may use thirty-two short circuit detection circuits 32. The thirty-two short circuit detection circuits may receive thirty-two alternating complementary input signals and produce thirty-two error signals. Due to the number of input signals that need to be produced, the number of error signals to be analyzed, and the number of signal lines to be routed, Applicants have appreciated that the short circuit detection module architecture of FIG. 3 can become more difficult to implement as the number of drive and sense lines in the touch panel increases.

Figure 7:
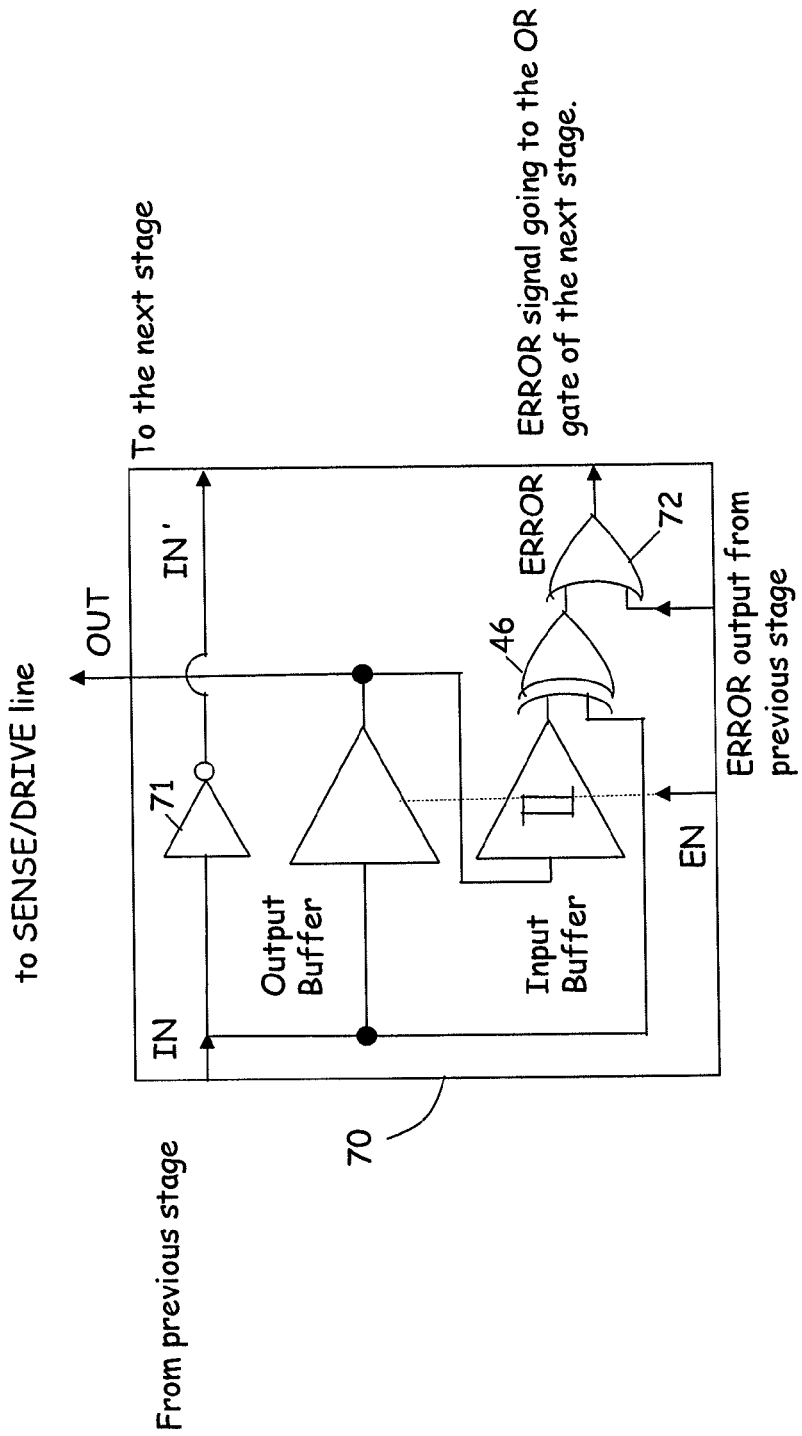
FIG. 7 shows another example of a short circuit detection circuit, according to some embodiments.
Figure 8:
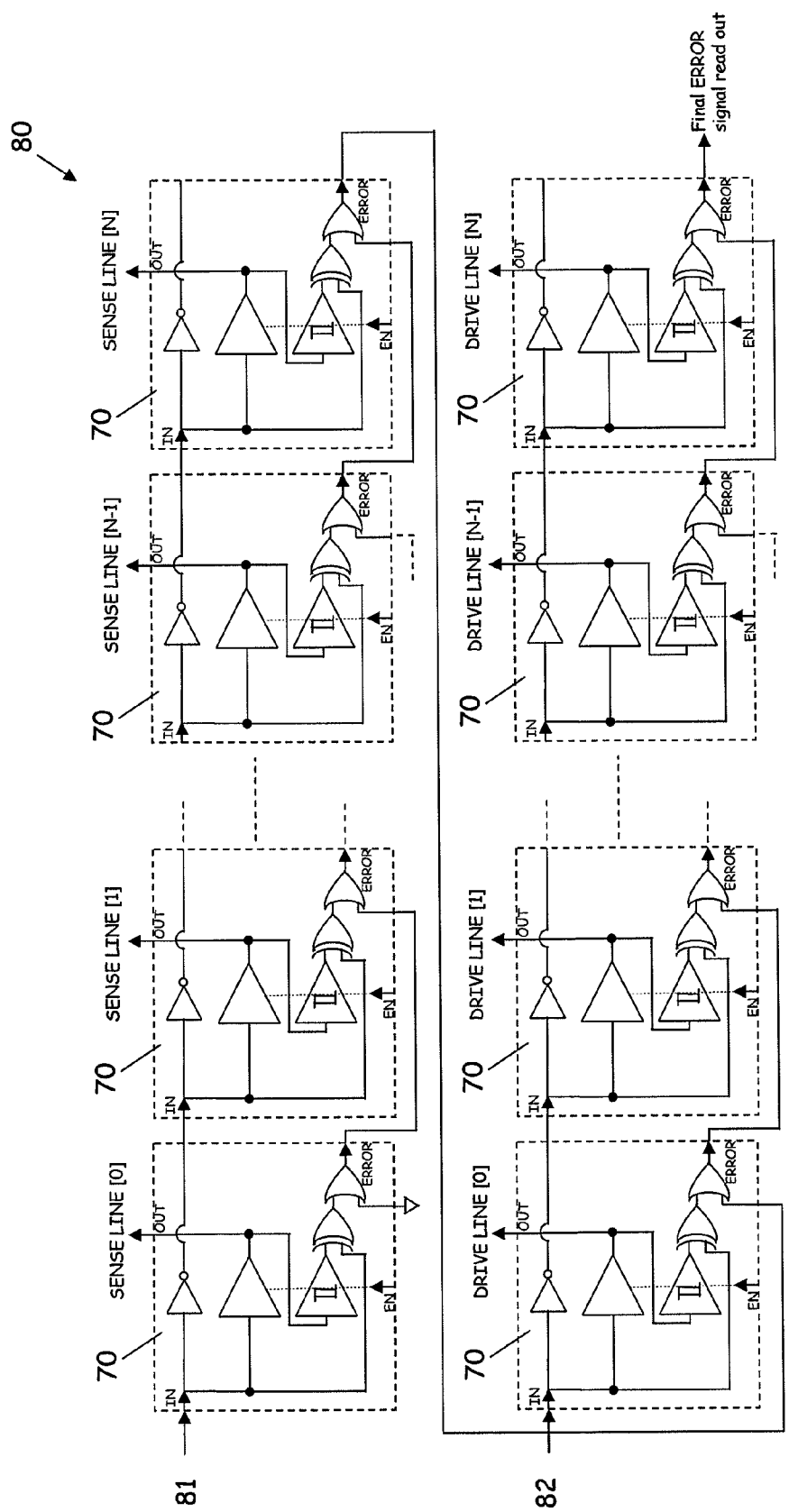
FIG. 8 shows an example of a short circuit detection module that includes a plurality of short circuit detection circuits connected in series, according to some embodiments.

FIG. 7 shows an example of a short circuit detection circuit 70 that may be chained together in series with other short circuit detection circuits 70, according to some embodiments. As shown in FIG. 7, short circuit detection circuit 70 is similar to the short circuit detection circuit 32 of FIG. 4, with the addition of an inverter 71 and an OR gate 72. Inverter 71 receives the input signal IN and produces a complementary input signal IN' for the next short circuit detection circuit in the chain which drives the next adjacent conductive line. OR gate 72 receives the error signal produced by XOR gate 46 for the current stage 70 and the error signal from the previous stage 70. The output of OR gate 72 indicates whether a short circuit has been detected at the conductive line corresponding to short circuit detection circuit 70, or in any previous stage. As shown in FIG. 8, several short circuit detection circuits 70 can be chained together in series, with each short circuit detection circuit 70 providing to the next short circuit detection circuit 70 an inverted input signal and a cumulative error signal. This architecture can reduce the number of input signals IN that need to be generated separately and the number of error signals ERROR to be analyzed. This architecture can also reduce the number of control lines needed for providing the input and error signals to the short circuit detection circuits 70.

FIG. 8 shows an example of a short circuit detection module 80 that includes short circuit detection circuits 70, according to some embodiments. Short circuit detection module 80 can include a short circuit detection circuit 70 for each sense and drive line of the touch panel. As shown in FIG. 8, a first input signal 81 can be generated for the short circuit detection circuits 70 corresponding to the sense lines. Each short circuit detection circuit 70 for the sense lines provides to the next stage an inverted version of the input signal and the cumulative error signal. A second input signal 81 can be generated for the short circuit detection circuits 70 corresponding to the drive lines. Each short circuit detection circuit 70 for the drive lines provides to the next stage an inverted version of the second input signal and the cumulative error signal. The inputs for the drive and sense lines may be different in order to detect the possible short circuits between adjacent sense and drive lines. In some embodiments, four input combinations can be used in sequence to detect a short circuit between adjacent sense and drive lines. These combinations can include sense=0, drive=0; sense=0, drive=1; sense=1, drive=0; sense=1, drive=1, where "sense" corresponds to first input signal 81 and "drive" corresponds to second input signal 82. It should be appreciated that such inputs can be provided in any suitable sequence, not necessarily in the order described above. The error signal from each stage can be provided to the OR gate 72 of the next stage to produce a cumulative error signal. As shown in FIG. 8, a single cumulative error signal may be used for the drive and sense lines, in some embodiments.

This invention is not limited in its application to the details of construction and the arrangement of components set forth in the foregoing description or illustrated in the drawings. The invention is capable of other embodiments and of being practiced or of being carried out in various ways. For example, in some cases, operation of the touch panel at a particular location can be sensed when an object comes into the proximity of the touch panel without coming into contact with the transparent insulating surface, as the proximity of an object alone can change the capacitance between the drive and sense lines. Thus, the term "touch panel," as used herein, is not limited to a device in which objects make contact with a device to operate the touch panel, as touch panels can be operated in different manner. The techniques described herein are not limited as to the method in which the touch panel is operated.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A short circuit detection circuit for a touch panel, the short circuit detection circuit comprising:
    an output buffer configured to receive a first signal and to provide the first signal to a conductive line of the touch panel;
    an input buffer configured to receive a second signal from the conductive line; and
    a comparison circuit that determines whether the first signal and the second signal are at a same logic level.

2. The short circuit detection circuit of claim 1, wherein a pull-up capability of the output buffer is different from a pull-down capability of the output buffer.

3. The short circuit detection circuit of claim 2, wherein the output buffer has a first output resistance when the first signal has a low logic level and a second output resistance when the first signal has a high logic level, wherein the first output resistance is different from the second output resistance.

4. The short circuit detection circuit of claim 3, wherein the first output resistance or the second output resistance is at least three times the resistance of the touch panel between a drive and sense line.

5. The short circuit detection circuit of claim 2, wherein the output buffer has a higher pull-down capability than a pull-up capability.

6. The short circuit detection circuit of claim 2, wherein the output buffer has a higher pull-up capability than a pull-down capability.

7. The short circuit detection circuit of claim 1, further comprising an inverter coupled to receive the first signal and to provide an inverted version of the first signal to a second short circuit detection circuit.

8. The short circuit detection circuit of claim 1, further comprising a logic circuit coupled to receive a first error signal from a second short circuit detection circuit and a second error signal from the comparison circuit.

9. The short circuit detection circuit of claim 8, wherein the logic circuit is configured to perform an OR operation on using the first and second error signals and is coupled to provide a third error signal resulting from the OR operation to a third short circuit detection circuit.

10. The short circuit detection circuit of claim 8, wherein the logic circuit comprises an OR gate.

11. The short circuit detection circuit of claim 1, wherein the comparison circuit comprises an XOR gate.

12. A short circuit detection module for a touch panel, the short circuit detection module comprising:
    a first short circuit detection circuit coupled to a first conductive line of the touch panel, the first short circuit detection circuit being configured to drive the first conductive line with a first signal having a first logic level; and
    a second short circuit detection circuit coupled to second conductive line of the touch panel, wherein the first and second conductive lines of the touch panel are adjacent, the second short circuit detection circuit being configured to drive the second conductive line with a second signal having a second logic level that is complementary to the first logic level.

13. The short circuit detection module of claim 12, wherein the first short circuit detection circuit is configured to compare the first signal with a third signal detected from the first conductive line.

14. The short circuit detection module of claim 13, wherein the second short circuit detection circuit is configured to compare the second signal with a fourth signal detected from the second conductive line.

15. The short circuit detection module of claim 12, wherein the first short circuit detection circuit comprises:
    an output buffer configured to drive the first conductive line with the first signal;
    an input buffer configured to detect the third signal; and a comparison circuit that determines whether the first signal and the second signal are at a same logic level.

16. The short circuit detection module of claim 15, wherein a pull-up capability of the output buffer is different from a pull-down capability of the output buffer.

17. The short circuit detection module of claim 15, wherein the first short circuit detection circuit further comprises an inverter coupled to receive the first signal and to provide an inverted version of the first signal to the second short circuit detection circuit.

18. The short circuit detection module of claim 15, wherein the first short circuit detection circuit further comprises a logic circuit coupled to receive a first error signal from a third short circuit detection circuit and a second error signal from the comparison circuit, wherein the logic circuit is configured to perform an OR operation using the first and second error signals and is coupled to provide a third error signal resulting from the OR operation to the second short circuit detection circuit.

19. The short circuit detection module of claim 18, wherein the logic circuit comprises an OR gate.

20. The short circuit detection module of claim 15, wherein the comparison circuit comprises an XOR gate.

21. The short circuit detection module of claim 12, wherein the touch panel comprises n drive lines and m sense lines, wherein the short circuit detection module comprises n+m short circuit detection circuits.

* * * * *